May 11, 1954 — C. N. BERGMANN — 2,678,124
CONTAINER CONVEYER COMBINER SYSTEM
Filed April 13, 1950 — 3 Sheets-Sheet 1

INVENTOR
Christian N. Bergmann
by Hooper, Leonard & Glenn
his attorneys

May 11, 1954     C. N. BERGMANN     2,678,124
CONTAINER CONVEYER COMBINER SYSTEM
Filed April 13, 1950     3 Sheets-Sheet 3

INVENTOR
Christian N. Bergmann

Patented May 11, 1954

2,678,124

UNITED STATES PATENT OFFICE 2,678,124

CONTAINER CONVEYER COMBINER SYSTEM

Christian N. Bergmann, Pittsburgh, Pa.

Application April 13, 1950, Serial No. 155,678

19 Claims. (Cl. 198—32)

This invention relates to a combiner system by means of which containers moving along approach conveyors merging into a junction can be combined without jamming or upsetting. More particularly, this invention relates to a pair of approach conveyors which converge to a junction leading into a single receiving conveyor so that groups of containers such as bottles, cans and others may be fed into the receiving conveyor in staggered groups from the respective approach conveyors automatically in close following relation without difficulty.

In the container conveyor art the need frequently arises to combine two streams or columns of moving containers into a single stream or column without jamming or interference at the junction of the streams. This need is particularly acute in operations involving the use of automatic machinery at the respective ends of the respective conveyors. Thus, for example, in dairy installations two washing machines may supply groups of milk bottles to two approach conveyors in staggered relation for carriage to a combining junction where they are combined and moved along a single receiving conveyor to a filling machine capable of handling the output of both washers. One combining arrangement which may sometimes be chosen is shown in my United States Patent No. 2,371,419. In another situation, two filling machines may supply filled milk bottles in individual spaced relation respectively to two approach conveyors adapted to supply a single column of bottles to a single hooding machine such as is used by some dairies.

In the system of the present invention, it makes no difference whether the glass milk bottles or other containers to be combined are round or cylindrical, or rectangular. Moreover, in such systems, precise combining is obtained without jamming, upsetting or other interference with the operation by novel means. This invention is particularly useful in view of the modern tendency for automatic dairy and canning machinery to move toward higher capacities with necessarily more closely correlated actions.

Other objects and advantages of this invention will be apparent from the following description and from the drawings, which are illustrative only, in which Figure 1 is a schematic plan view of a typical conveyor layout, utilizing the system of this invention, at the start of a combining operation;

General operation

Figure 1:
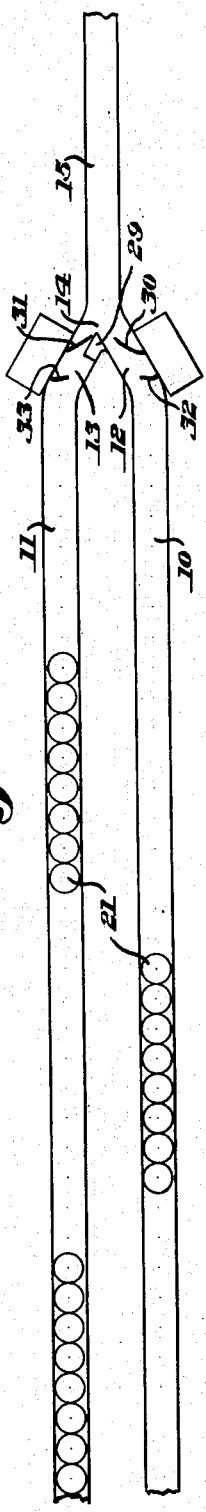
Figure 2:
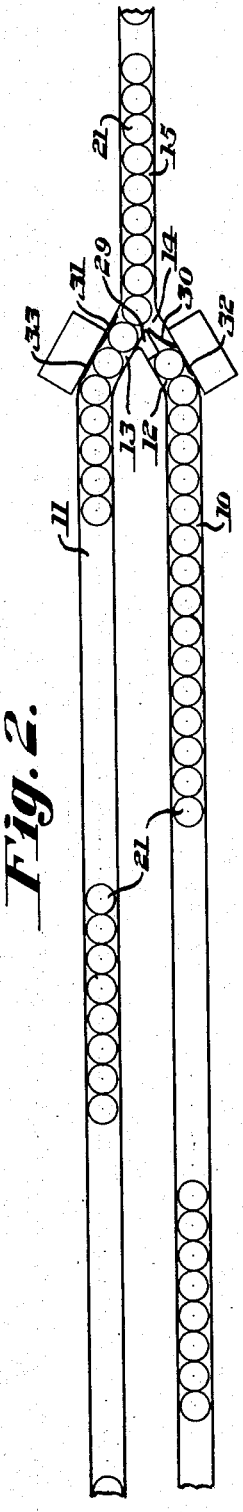
Figure 2 is a similar view of the layout shown in Figure 1 as the first group of containers on one side is passing through the combining junction.
Figure 3:
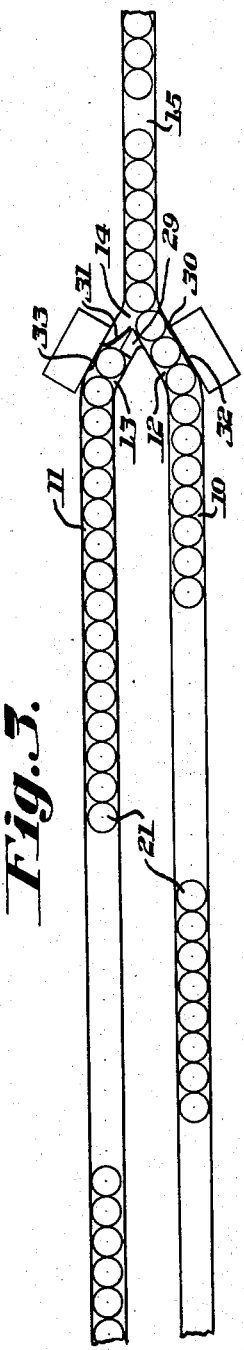
Figure 3 is a similar view of the layout shown in Figures 1 and 2 as a subsequent group of containers on the other side is passing through the combining junction.

Referring to Figures 1 to 3, the conventional approach conveyors may be respectively numbered 10 to 11. Their converging sections 12 and 13 respectively merge into a junction 14 leading into a single receiving conveyor 15.

Figure 4:
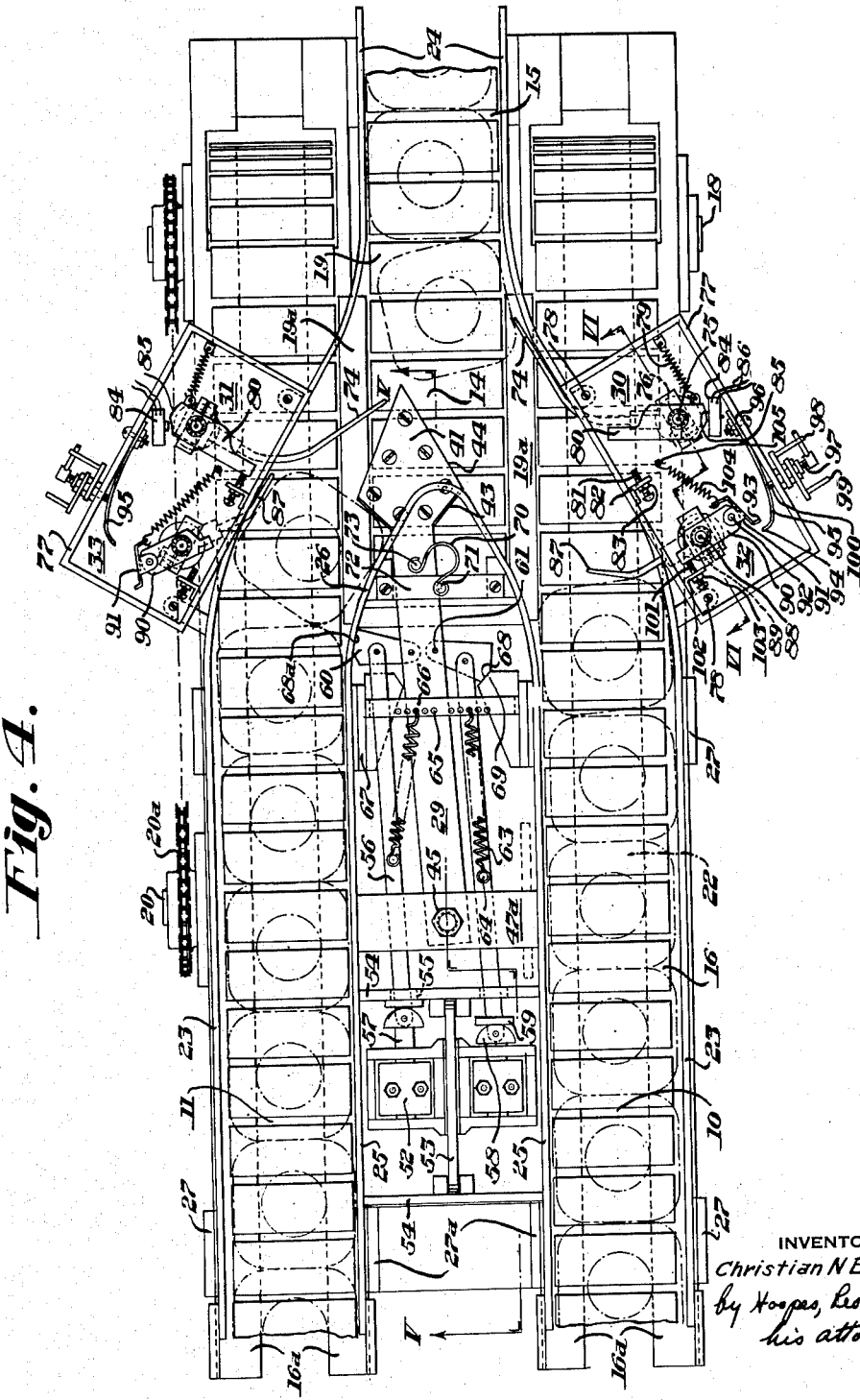
Figure 4 is a plan view on a reduced scale of one embodiment of the system of this invention corresponding to the embodiment schematically shown in Figures 1 to 3 but with the covers removed and with square bottles on the conveyors.
Figure 5:
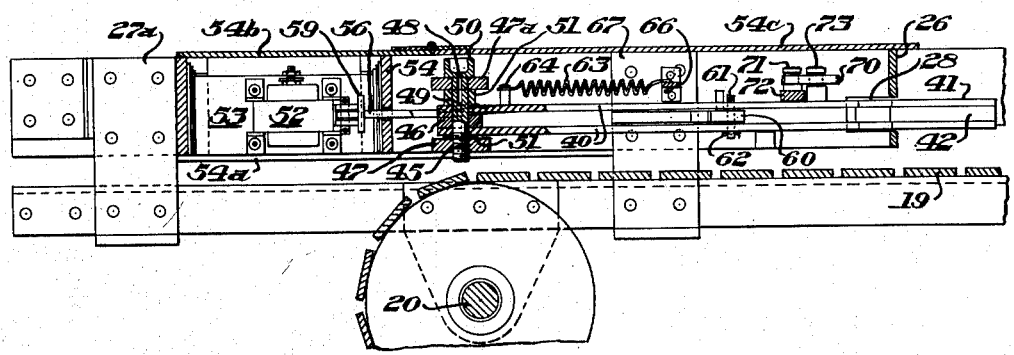
Figure 5 is a view in elevation taken along line V—V of Figure 4 with the cover pertaining thereto in place.

As more clearly shown in Figures 4 and 5, each of the approach conveyors comprises articulated flat links 16 forming an endless chain which in the case of conveyors 10 and 11 bend around suitable sprockets (not shown) on a sprocket shaft 18. Similarly, the articulated flat links 19 of conveyor 15 may be engaged by a suitable sprocket (not shown) keyed to a sprocket shaft 20. Usually, the linear speed of the three conveyors will be the same and they may be driven from a common power source and linked by a chain 20a. The links 16 are provided with flat outward surfaces to form a moving flat bed across the chain rails 16a across the uppermost reach of the respective conveyors for the containers 21 which, as shown in Figures 1 to 3, are cylindrical glass milk bottles although they may be rectangular glass milk bottles 22 as shown in Figure 4. Links 19 are similar and similarly mounted. Guide rails 23 of conventional character are usually provided along the outer sides of the respective approach conveyors 10 and 11. These guide rails 23 converge in the area of junction 14 and continue as the guide rails 24 of the receiving conveyor 15. The inner sides of the approach conveyors 10 and 11 are provided with standard vertical guide rails 25 which also converge in the area of junction 14 forming a blunt-nosed section 26 which usually comprises a suitably shaped bend in the guide rail strip used in making up this portion of the conveyor. Further, such outer guide rails at least, as shown in Figure 5, may be held in spaced relation to the chain rails by suitable vertical brackets such as bracket 27. The inner guide rail 25 is slotted at 28 in section 26 and supported by similar brackets 27a. Standard bridge plates 19a extend between the respective approach conveyors and the receiving conveyor at junction 14.

Assuming that there is an 8-bottle washer delivering into conveyor 10 and a second such washer delivering into conveyor 11, such washers, in accordance with standard practice, will alternately deposit such subgroups of 8 on the respective approach conveyors. Thereafter, these groups will move along as spaced groups and in staggered relation to the groups deposited on the other conveyor by the other washer. At the inception of a new operation cycle following shutdown, for example, in the system of this invention a swingable member 29 may be in the position shown in Figure 1 with a contact member assembly 30 and a second contact member assembly 31 respectively projecting into the converging portions of the channels of conveyors 10 and 11 adjacent the free end of member 29. A grouping member assembly 32 and a second grouping member assembly 33 on the advance side respectively of members 30 and 31 also project into the channels of conveyors 10 and 11 so as to be encountered by the movement of containers therein.

If it be assumed that members 32 and 33 are constructed or adjusted to release under the pressure of 16 bottles in a single group, it will be apparent that grouping member 33 will halt the leading subgroup of 8 bottles moving along conveyor 11 and thereafter grouping member 32 will halt the first group of 8 bottles moving along conveyor 10. These conveyors are conventionally constructed to permit the links 16 to slip relative to the containers thereon when the movement of containers thereon is arrested.

When the second subgroup of 8 bottles moving along conveyor 11 abuts the rear of the first subgroup, grouping member 33 will be depressed and swung out of the way by the pressure thereof under the frictional force of links 16 in conveyor 11. Upon the leading bottle of that group of 16 bottles in conveyor 11 reaching member 29, it too will be swung out of the way thereby as will contact member 31. The moving aside of contact 31 will lock member 29 in the position shown in Figure 2 permitting all of the bottles in the group of 16 in conveyor 11 to pass into conveyor 15 which carries them forward on links 19. Soon after the movement of the parts into the position shown in Figure 2, as determined by the gap or distance that separates the last bottle in the group of 16 bottles passing through junction 14 from conveyor 11 from the first bottle in the second subgroup of 8 bottles moving along conveyor 10, a group of 16 bottles will have been formed in conveyor 10 and will depress grouping member 32. This will allow the first column of 16 bottles in conveyor 10 to move grouping member 32 out of the way bringing the column up against the swingable member 29 obstructing section 12 adjacent junction 14. In its obstructing position in section 12 swingable member 29 will prevent contact member 30 from being moved out of the channel in the converging section 12 until member 29 moves again into obstructing position in section 13. Swingable member 29 cannot move into obstructing position in section 13 of conveyor 11, as shown in Figure 3, until the group of 16 bottles from conveyor 11 has passed into junction 14 or conveyor 15 permitting contact member 31 to again rise and project into the channel of conveyor 11, thus unlocking swingable member 29 so it may be moved from its obstructing position relative to containers on conveyor 10. As soon as swingable member 29 is unlocked, the pressure of the group of 16 bottles in conveyor 10, as shown in Figure 2, will swing member 29 so as to obstruct bottles moving on conveyor 11. About the same time, contact member 30 will be depressed or moved out of the channel of section 12 and will thereby lock member 29 in the position shown in Figure 3. As soon as member 29 is locked in the obstructing position shown in Figure 3, the second group of 16 bottles from conveyor 11 may press against member 29 without affecting any movement thereof and hence cannot jam the column of bottles from conveyor 10 then passing through junction 14 into conveyor 15. Whether or not there is initially any gap between the columns from the respective approach conveyors in their alternating positions in conveyor 15, is usually a matter of little moment since the operation of the automatic machinery normally at the delivery end of conveyor 15 is set to maintain a constant stock or reservoir which will enable any such gap to be closed.

It is evident that the sequence illustrated in Figures 1 to 3 can be varied for different subgroupings, groupings and capacities by those skilled in the art. Further, if the conveyors 10 and 11 are connected at their receiving ends to filler machines leading, for example, to a hooding machine capable of taking the output of both thereof, the individual bottles moving along conveyors 10 and 11 will be separated. Again, corresponding bottles in the two approach conveyors will usually be staggered and, hence, will complete the column of 16 or other preselected number necessary to move the respective grouping members out of the way at different instants, thereby maintaining the preferred staggering of the respective columns as they approach the swingable member.

It is possible to dispense with grouping members corresponding to member assemblies 32 and 33 and rely entirely upon the swingable member and the respective contacting member assemblies for alternate admission of groups of containers from the respective approach conveyors into the receiving conveyor 15 through junction 14. In this latter case the contacting members are so constructed that they are engaged or depressed by the advancing column on that side substantially at the instant that the swingable member is engaged or pressed if then in an obstructing position on the same side. If not in such an obstructing position on the same side, even though the two columns of containers may be moving precisely abreast, there is a sufficient momentary resistance in the channel obstructed by the swingable member to enable the contacting member in the other unobstructed channel to lock the swingable member before it has an opportunity to swing to its other obstructing extreme. This sequence then sets up the commencement of a staggered cycle which thenceforth proceeds in a normal alternating manner. In general, however, a grouping member assembly will be associated with each of the approach conveyors in advance of the swingable member and respective contact member assemblies.

*Specific embodiment*

Figure 6:
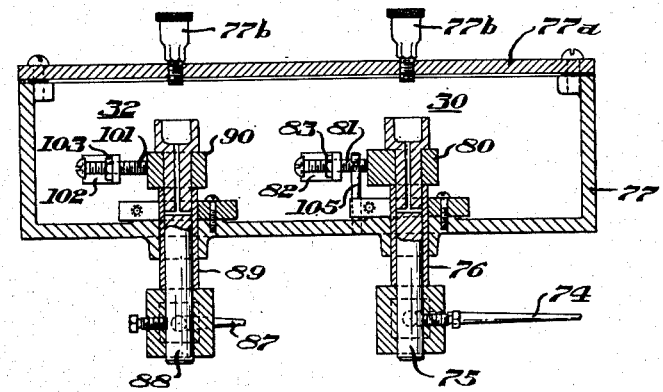
Figure 6 is an enlarged view in elevation taken along line VI—VI of Figure 4 with the cover pertaining thereto in place.

In one specific embodiment of the system of this invention as shown in Figures 4 to 6, the swingable member 29 comprises two superposed plates 40 terminating in an enlarged end 41 in the form of a diamond or spearhead pointing generally in the direction of the receiving conveyor. These ends 41 project into junction 14 through slot 28 so that in either side position they will obstruct the respective approach conveyor on that side. The plates 40 are bolted together through a rubber pad 42 at the ends 41. The pad 42 is similar in outline to ends 41 but slightly larger along the rearward faces 43 so as to provide vertical cushioned faces at those surfaces. The rearward faces 43 are respectively engaged by the columns or groups of containers 22 approaching junction 14 in the respective approach conveyors. The angle of engagement is such that such pressure tends to swing the member 29 to the other extreme or side of the arc of its movement. The faces 44 in general comprise the corresponding edges of plates 40 and respectively provide an extension of the converging section 26 of the inner guide rail along which bottles can slide for that approach conveyor which at the time being is not being obstructed by the member 29.

The plates 40 are held together at the other end to complete the arm which forms the swingable member 29 by being pivotally mounted on a pivot bolt 45. A spacing block 46 is welded respectively to the inwardly opposed surfaces of plates 40 for the passage of the pivot 45. The lower end of bolt 45 is threaded and screwed into a tapped hole in crosspiece 47 fastened to the immovable structure of that section of the conveyor assembly. A second and similarly fastened crosspiece 47a extends across the space between guide rails 25 and supports the upper end of bolt 45. The upper end of bolt 45 is counterbored at 48 and a hole 49 is drilled to the counterbore so that an oil cup 50 may be mounted on top of bolt 45 to lubricate the bearing for member 29. Bearing washers 51 are provided on both sides of the arm to complete the pivotal mounting assembly.

Rearwardly of swingable member 29 are two solenoids 52 symmetrically arranged about the plane bisecting the space between the guide rails 25. These solenoids are bolted to a center partition 53 which in turn is fastened to two cross brackets 54. The forward cross bracket is provided with openings 55 therein for the passage of links 56. Links 56 are respectively connected at their rearward ends to movable central core portions 57 adapted to be moved axially relative the window of the respective solenoid 52 whenever that solenoid is energized. A stop 58 on core 57 and a rubber annulus 59 on link 56 marks the limits of the axial travel of core portions 57 and their associated links 56 respectively. Opening 55 is provided of sufficient size to permit the angular movement of the links 56 that occurs in the operation of the system of this invention.

The cross brackets 54 form with the portions of the guide rails 25 between them and a bottom plate 54a and a top plate 54b a water-tight box for the solenoids 52. Moreover, when the machine is at rest the rubber annuli 59 close the openings 55. In this way, when the machine is washed down, as with a hose, no water can enter the enclosure containing the solenoids 52, thereby protecting them against short circuits and deterioration. A cover 54c is hinged to the forepart of top plate 54b and extends forwardly resting on the upper edge of section 26 and providing a cover for the mechanism between the guide rails 25. In many cases, the mechanism comprising the system of this invention including the solenoids is so made that it can be bodily lifted out of the space between the approach conveyors after making appropriate disconnections in the event that maintenance or repair work thereon is in order.

Links 56 extend forwardly generally parallel to arm 29 and are pivotally connected at their forward ends to generally sector-shaped blocking members 60. These blocking members or locking triggers are pivotally journaled at their inner ends on journal pins 61. Cotter pins 62 on the upper and lower side of arm 29 maintains the pins 61 in vertical position for movement of blocking members 60 thereon. The height of the blocking members is such that they fit at their inner ends between the plates 40. Springs 63 are fastened between a post 64 on each link 56 and openings 65 in a retainer bracket 66. Retainer bracket 66 is fastened to vertical plates 67 which are attached to the conveyor base. A plurality of holes 65 is provided in bracket 66 to suitably adjust the tension of the respective springs 63. These springs normally urge the blocking members 60 out of locking or holding position and the annuli 59 into closure position relative to openings 55.

However, when any solenoid 52 is energized, its core 57 and the link 56 connected thereto is pulled rearwardly causing its member 60 to engage its locking face 68 against a stop 69, as shown by the lower blocking member in Figure 4. These respective stops 69 are rigidly fastened to the brackets 67. The other blocking member 60, the upper one as shown in Figure 4, has a face 68a with a contour corresponding to the contour of the adjacent guide rail 25 so as to clear rail 25 when swung into or out of locking position. The extremes of the swing of member 29 are defined by the vertical edges of slot 28. On the other hand, in some cases the face 68a can be designed for use as a stop against rail 25 for the side of arm 29 towards its obstructing position while the blocking member 60 on the other side acts as a lock as described above to hold member 29 in that particular obstructing position.

A toggle 70 in the form of a bent spring may be provided extending between a post 71 fixed on a bracket 72 and a post 73 fixed on swingable member 29. In the form shown, toggle 70 can pivot about each post. The toggle 70 has sufficient strength to maintain swingable member 29 in obstructing position on one side or the other of the center line between the two approach conveyors. Further, this toggle 70 may also be made of sufficient strength to itself act as a grouping control to prevent any pressure by a column of bottles against face 43 projecting into, let us say, conveyor 11, from moving arm 29 to obstructing position in conveyor 10 until that column in conveyor 11 has reached a predetermined number of individual containers in grouped contact with each other.

Each solenoid 52 may be energized and de-energized by means of an electrical switch controlled by a contacting member. Thus, as shown in Figure 4, for the solenoid which is energized placing the lower blocking member 60 in locking engagement to insure that head 41 of swingable member 29 remains in obstructing position relative to bottles in approach conveyor 11, to be so energized, contacting member 30 must be depressed or moved out of the path of travel of containers moving through converging portion 12. Conversely, when member 29 is obstructing containers from approach conveyor 10 the contacting member 31 will be moved out of the way by the bottles passing through converging section 13.

Each contacting member comprises a contact arm 74 keyed to a shaft 75 which extends through a bearing 76 in a housing 77 fastened by bolt 78 to a shelf on guide rail 23. The contact arm of each contacting member assembly is usually mounted so as to extend into the respective conveyor channel through the space below the guide rails 23. A spring 79 fastened between housing 77 and a lever extension 80 which is also keyed to shaft 75 maintains contact arm 74 in raised, that is, in a position projecting into the path of travel of the containers from the approach conveyor on that side of the system. An adjusting screw 81 threadably engages a bracket 82 fastened to housing 77. A locking nut 83 maintains screw 81 in position to make contact with arm 74 in the appropriate angular position selected for the particular operation. A conventional microswitch 84 is also fastened to housing 77 and engaged by a cam surface 85 at the end of lever 80. Electrical leads 86 are connected to the corresponding leads of respective solenoid 52. The strength of spring 79 is selected to permit even a single container to depress arm 74.

In this way, when contact arm 74 is depressed or moved out of the way of the aforesaid path of travel, the solenoid 52 on that side of the system is energized, locking member 29 in obstructing position on the other side of the system. For example, the depressing of the contact arm in switch assembly 30 has caused the lower blocking member 60, as shown in Figure 4, to block arm 29 in the obstructing position in the path of travel of the containers from conveyor 11 irrespective of the pressure that may be brought against face 43 while it is projecting into conveyor section 13. Conversely, the upper blocking member 60 in Figure 4 will be moved into holding or locking position when member 29 is in obstructing position in conveyor section 12 and the contact arm in switch assembly 31 is depressed.

It should be noted that when using grouping member assemblies 32 and 33, the respective contact arms 74 of the switch assemblies 30 and 31 are engaged by the foremost containers in each of the actuating groups in each approach conveyor slightly behind the position of the respective faces 43 on member 29. Thus, when arm 29 is swung out of obstructing position in one channel, it will be snapped over to obstructing position in the other channel usually just about at the time the containers moving the arm 29 contact the contact arm 74 in the first-named channel. Moreover, the depressed contact arm 74 will usually leave the last container in the group passing through the junction at the time being slightly after it clears the extreme forward tip of member 29 to assure, particularly in the case of square bottles, that the last bottle is well positioned for movement along conveyor 15 no matter how closely following the succeeding group from the other approach conveyor may follow.

The grouping member assemblies 32 and 33 may also be mounted in the respective housing 77 in advance of the electrical switch assembly as shown in Figures 4 and 6. Each grouping member assembly may comprise a contact arm 87 keyed to a shaft 88 mounted in a bearing 89 fastened to housing 77. Lever extension 90 is also keyed to shaft 88 and has a trip 91 pivotally connected thereto at 92. Trip 91 has a lower edge 93 which is adapted to catch on edge 94 of a catch spring 95 when shaft 88 is turned in a counterclockwise direction, as viewed in Figure 4, for grouping member assembly 33. Catch spring 95 is fastened at one end 96 to housing 77. An adjustment post 97 can be rotated between fixed stops 98 and 99 varying the projection of its inner end 100 and thereby varying the amount of overlap between the respective edges 93 and 94 to correspondingly vary the number of abutting containers in a single column in an approach conveyor are required to depress the contact arm 87 of the respective grouping member. A screw 101 is threaded through a bracket 102 fastened to housing 77 and enables a suitable adjustment of the angular position of contact arm 87 to be made. A locking nut 103 maintains screw 101 in its adjusted position. A cover 77a closes housings 77 and is provided with lubrication drip fittings 77b for the oil cups on the shafts 75 and 88.

In operation, the grouping member assembly 32 or 33 is so made that while edge 93 must press edge 94 out of the way when contact arm 87 is depressed, the trip 91 rocks on pivot 92 when contact arm 87 returns to its normally raised or projecting position under the influence of a spring 104 connected between a post 105 on housing 77 and the end of trip 91 away from edge 93. No claim is made herein to any grouping member assembly by itself as such is more fully set forth in my copending United States patent application Serial No. 670,824 filed May 18, 1946. Another grouping member mechanism is also disclosed in my United States Patent No. 2,363,738. In the aforesaid application and patent the grouping control combination includes an electrical switch and is used in a different system.

*Modified embodiments*

In one modified embodiment the grouping member assemblies may be omitted. In such cases a toggle, corresponding to toggle 70, is provided of sufficient strength to cause the respective faces 43 to act as groupers for the two approach conveyors. Even at the start of operations in the event that the groups of bottles in the two approach conveyors should advance and converge exactly simultaneously, the greater resistance in that channel in which both the contact lever of the switch assembly and the projecting head 41 of the swingable member corresponding to arm 29 are present, will enable the group moving in the channel on the other side to depress the switch contact arm and lock the swingable member in its initial position. This will continue until there is a gap in the column of bottles moving along the unobstructed approach conveyor enabling the containers in the other approach conveyor to gain control of the system.

A further modified embodiment may be provided similar to the embodiment shown in Figure 4, but with the addition of two further grouping member assemblies respectively positioned in advance of the assemblies 32 and 33. In this way, if in the actuating group of bottles in the converging channel not obstructed by the swingable member, the tail-end bottle should straggle between the most advanced grouping member and the contact member, the intermediate grouping member will stop such straggling container and hold it to be added to the head of the succeeding actuating group passing through on that side. Further, although the embodiments described above include a pair of approach or confluent conveyors merging into a single succeeding or receiving conveyor, under certain circumstances, the system of this invention may be employed in combination with other means for crossovers between conveyors on the same level to avoid feeding across the crossing from more than one of the approach conveyors at a time.

Various other modifications may be made in accordance with this invention by those skilled in the art which are within the spirit of the system of this invention and the scope of the appended claims.

I claim:

1. In a container conveyor combiner system having at least a pair of approach conveyors merging into a single receiving conveyor, in combination, a unitary swingable member having a single end movable in a plane generally parallel to the plane of said approach conveyors to alternately obstruct said approach conveyors, a plurality of means for respectively holding said end in its alternate obstructing positions, contact means associated with each of said approach onveyors and operable by the pressure of containers to selectively operate said first-named means relative to said end obstructing the other of said approach conveyors, and yieldable means connected to said swingable member to resist displacement of said end from its respectively said alternate obstructing positions.

2. In a container conveyor system, in combination, a swingable member movable into and out of the path of travel of containers along said conveyor system, a contact member normally projecting into said path of travel and adapted to be moved out of said path of travel by said containers, a blocking member actuated by said contact member, said blocking member being pivotally mounted between said swingable member and the adjacent side of said conveyor system, said blocking member further being adapted when so actuated to move into blocking position to hold said swingable member out of said path of travel.

3. In a container conveyor combiner system having approach conveyors merging at a junction, in combination, a swingable member pivotally mounted between said approach conveyors to alternately project thereinto adjacent said junction and thus obstruct one of said approach conveyors while extending a side of the other, a pair of laterally extending blocking members pivotally mounted in opposed relation on said member, and means for moving the blocking member on the side of said swinging member away from the approach conveyor into which said swinging member projects to lock said swinging member in such position.

4. In a container conveyor combiner system having approach conveyors merging at a junction, in combination, a swingable member pivotally mounted between said approach conveyors to alternately project thereinto adjacent said junction, a pair of pivotally mounted and laterally extending blocking members positioned between said swingable member and the respective adjacent sides of said approach conveyors, each of said blocking members being of a length sufficient to act as a stop for the movement of said swingable member toward the approach conveyor to be obstructed and as a lock to prevent movement of said swingable member after it has been swung into obstructing position in the other approach conveyor, and contact means along each of said approach conveyors adjacent said junction to respectively actuate said blocking members.

5. In a container conveyor combiner system having more than one approach conveyor merging into a lesser number of receiving conveyors at a conveyor junction, in combination, a swingable member movable in a plane generally parallel to the plane of said approach conveyors to alternately obstruct said approach conveyors adjacent said junction, a block positioned on each side of said member and movable to selectively hold it in obstructing position, selective means to move said blocks alternately into holding position, and contact means associated with each of said approach conveyors to selectively operate said selective means.

6. In a container conveyor combiner system having a confluence of approach conveyors to form a single conveyor, in combination, a swingable member positioned between said approach conveyors, said member having one end thereof movable in the area of said confluence to alternately obstruct one of said approach conveyors and extend the other of said approach conveyors, blocking means between said approach conveyors to hold said member in its respective obstructing positions, axially movable means for actuating said locking means, and contact means mounted on said approach conveyors adjacent said conflence and said end of said member to selectively actuate said locking means when said member reaches an obstructing position.

7. In a container conveyor combiner system in which a pair of approach conveyors joins to form a single receiving conveyor, in combination, a swingable member movably positioned between the inner sides of said approach conveyors adjacent the junction thereof and movable in a plane parallel to the plane of said approach conveyors at said junction, said member in each of its extreme positions being adapted to obstruct one of said approach conveyors and generally extend the other towards said single conveyor, a block movable into locking position between said member and the adjacent inner side of one of said approach conveyors when said member is obstructing the other of said approach conveyors, a link connected to each block, a solenoid to actuate each link, and a contact arm in normally obstructing position associated with each of said approach conveyors adjacent said junction to effect the energization of said solenoid and lock said member in obstructing position relative to the other of said approach conveyors when said contact arm is contacted by containers moving through said approach conveyor.

8. In a container conveyor combiner system having a pair of approach conveyors merging into a junction and containers moving along said approach conveyors toward said junction in staggered relation, in combination, a swingable member mounted between said approach conveyors to alternately obstruct them adjacent said junction, a pair of blocking members movably connected to said swingable member between the same and the respective inner sides of said approach conveyors, an electrical switch assembly normally projecting into each of said approach conveyors adjacent the obstructing portion of said swingable member, said switch assemblies being respectively moved by said containers, and a solenoid connected to each of said blocking members, said solenoids being respectively actuated by said switch assemblies to lock said swingable member in obstructing position relative to one approach conveyor so long as containers operate the switch assembly in the other of said approach conveyors.

9. In a container conveyor combiner system having a pair of approach conveyors merging into a junction and containers moving along said approach conveyors toward said junction in staggered relation, in combination, a swingable member mounted between said approach conveyors to alternately obstruct them adjacent said junction, a pair of blocking members movably connected to said swingable member between the same and the respective inner sides of said approach conveyors, an electrical switch assembly normally projecting into each of said approach conveyors adjacent the obstructing portion of said swingable member, said switch assemblies being respectively moved by said containers, resilient means for restoring said blocking members to non-blocking position, and a solenoid connected to each of said blocking members, said solenoids being respectively actuated by said switch assemblies to lock said swingable member in obstructing position relative to one approach conveyor so long as containers operate the switch assembly in the other of said approach conveyors.

10. In a container conveyor combiner system having a pair of approach conveyors merging into a junction, in combination, a swingable member positioned between the inner sides of said approach conveyors, said swingable member extending toward and projecting into said junction so as to obstrust one approach conveyor and generally extend the other approach conveyor in each of its side positions, a pair of generally laterally extending blocking members pivotally mounted between said swingable member and said inner sides on each side of said swingable member, a link member pivotally connected to each block and extending generally in the direction of said swingable member, means for moving the link member on the side of said swingable member away from the approach conveyor being obstructed to in turn move said blocking member connected thereto into blocking position, a switch assembly associated with each approach conveyor adjacent said junction to actuate said link member on said side of said swingable member, and means to return said blocking member to unlocked position when said switch assembly is not moved by said containers.

11. In a container conveyor combiner system having a pair of approach conveyors converging to a junction, in combination, a swingable member positioned between the inner sides of said approach conveyors to alternately obstruct each of them, locking means positioned between said swingable member and the inner sides of said approach conveyors to lock said swingable member in its respective obstructing positions, contact means associated with said approach conveyors adjacent said junction to actuate said locking means while containers are moving through said junction from the approach conveyor not being obstructed, and means for preventing said swingable member from assuming a non-obstructing position.

12. In a container conveyor combiner system having a pair of approach conveyors joining and forming a single receiving conveyor, in combination, a swingable arm positioned between said approach conveyors and movable in a plane generally parallel to the plane of said approach conveyors, a pair of laterally and oppositely extending blocks pivotally connected to said arm, means for moving said blocks into arm-locking position, resilient means for moving said blocks in an opposite direction upon the deenergization of said respective solenoids, an electrical switch assembly associated with each of said approach conveyors to energize its respective solenoid as containers pass said assembly, and a toggle member adapted to urge said arm substantially into one or the other of its obstructing positions.

13. In a container conveyor combiner system having a pair of approach conveyors merging into a junction, in combination, a swingable member positioned between the inner sides of said approach conveyors, said swingable member extending toward and projecting into said junction so as to obstruct one approach conveyor and generally extend the other approach conveyor in each of its side positions, a pair of generally laterally extending blocking members pivotally mounted between said swingable member and said inner sides on each side of said swingable member, a link member pivotally connected to each block and extending generally in the direction of said swingable member, means for moving the link member on the side of said swingable member away from the approach conveyor being obstructed to in turn move said blocking member connected thereto into blocking position, a switch assembly associated with each approach conveyor adjacent said junction to actuate said link member on said side of said swingable member, means to return said blocking member to unlocked position when said switch assembly is not moved by said containers, and means for urging said swingable member into one of its side positions.

14. In a container conveyor combiner system having a pair of approach conveyors merging into a junction and containers moving along said approach conveyors toward said junction in staggered relation, in combination, a swingable member mounted between said approach conveyors to alternately obstruct them adjacent said junction, a pair of blocking members movably connected to said swingable member between the same and the respective inner sides of said approach conveyors, an electrical switch assembly normally projecting into each of said approach conveyors adjacent the obstructing portion of said swingable member, said switch assemblies being respectively moved by said containers, a solenoid connected to each of said blocking members, said solenoids being respectively actuated by said switch assemblies to lock said swingable member in obstructing position relative to one approach conveyor so long as containers operate the switch assembly in the other of said approach conveyor, and bent spring means to prevent said swingable member assuming a non-obstructing position.

15. In a container conveyor combiner system having a pair of approach conveyors converging to a junction, in combination, a swingable member positioned between the inner sides of said approach conveyors and movable by the alternate passage of containers in one approach conveyor to obstruct the other of said approach conveyors, a grouping member associated with each approach conveyor in advance of the obstructing portion of said swingable member, said grouping member being releasable by a predetermined number of said containers, and means for locking said swingable member in one obstructing position relative to one approach conveyor while containers are moving through said junction from the other of said approach conveyor.

16. In a container conveyor combiner system having a pair of approach conveyors converging to a junction, in combination, a swingable member positioned between the inner sides of said approach conveyors and movable by the alternate pressure of containers in one approach conveyor to obstruct the other of said approach conveyor, a grouping member associated with each approach conveyor in advance of the obstructing portion of said swingable member, said grouping member being adjustable so as to be releasable by a predetermined number of said containers, and means for locking said swingable member in one obstructing position relative to one approach conveyor while a group of containers are moving through said junction from the other of said approach conveyors.

17. In a container conveyor combiner system having a pair of approach conveyors converging to a junction, in combination, a swingable member positioned between the inner sides of said approach conveyors and movable by the alternate passage of containers in one approach conveyor to obstruct the other of said approach conveyors, a grouping member associated with each approach conveyor in advance of the obstructing portion of said swingable member, said grouping member being releasable by a predetermined number of said containers, means for locking said swingable member in one obstructing position relative to one approach conveyor while containers are moving through said junction from the other of said approach conveyors, and means for preventing said swingable member from assuming a non-obstructing position.

18. In a container conveyor combiner system having a pair of approach conveyors converging to a junction, in combination, a swingable member positioned between the inner sides of said approach conveyors and movable by the alternate passage of containers in one approach conveyor to obstruct the other of said approach conveyors, a grouping member associated with each approach conveyor in advance of the obstructing portion of said swingable member, said grouping member being releasable by a predetermined number of said containers, a second grouping member between said first-named grouping member and said obstructing portion of said swingable member associated with each approach conveyor to catch straggling containers, and means for locking said swingable member in one obstructing position relative to one approach conveyor while containers are moving through said junction from the other of said approach conveyors.

19. In a container conveyor combiner system having at least a pair of approach conveyors merging into a single receiving conveyor, in combination, a unitary swingable member pivoted for movement in a plane generally parallel to the plane of said approach conveyors, said member having a single end spaced from said pivot to alternately obstruct said approach conveyors upon swinging movement of said member, means for holding said end in its alternate obstructing positions, contact means associated with each of said approach conveyors and operable by the pressure of containers to selectively operate said first-named means relative to said member obstructing the other of said approach conveyors, said contact means and said end being respectively positioned adjacent one another for conjoint operation, and resilient means connected to said swingable member to resist displacement of said end from its respectively said alternate obstructing positions.

References Cited in the file of this patent

UNITED STATES PATENTS

| Number | Name | Date |
|---|---|---|
| 1,281,579 | Johnson | Oct. 15, 1918 |
| 1,901,066 | Twomley | Mar. 14, 1933 |
| 2,371,419 | Bergmann | Mar. 13, 1945 |